June 28, 1938.   F. P. TIKALSKY   2,121,997
ARTICLE FORMING APPARATUS
Filed June 12, 1937
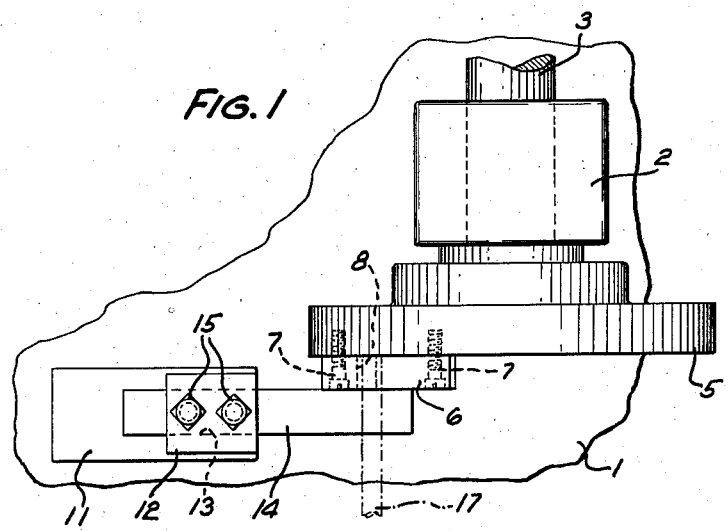
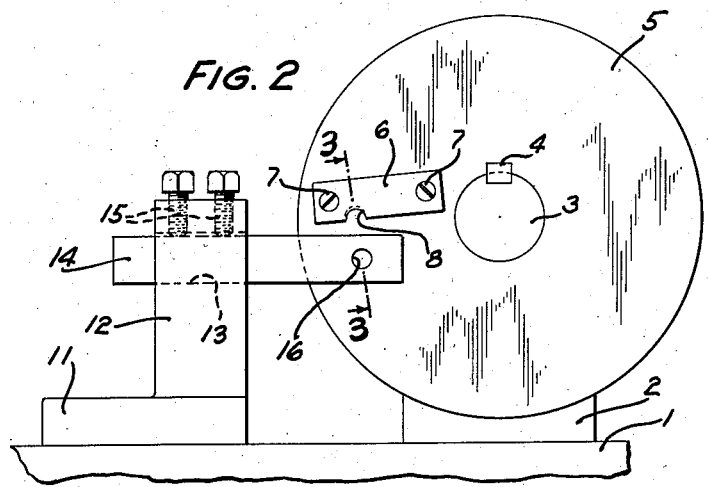
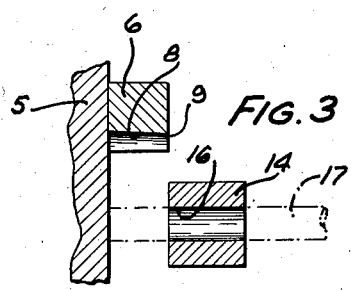
INVENTOR
F. P. TIKALSKY
BY Emery Robinson
ATTORNEY Patented June 28, 1938

2,121,997

UNITED STATES PATENT OFFICE 2,121,997

ARTICLE FORMING APPARATUS

Francis P. Tikalsky, La Grange Park, Ill., assignor to Western Electric Company, Incorporated, New York, N. Y., a corporation of New York Application June 12, 1937, Serial No. 147,927

3 Claims. (Cl. 164—60)

This invention relates to article forming apparatus and more particularly to tube or rod cutting apparatus.

It is an object of the present invention to provide a simple and inexpensive apparatus for expeditiously forming articles.

In accordance with one embodiment of the invention as applied to apparatus for cutting tubular insulators from tubular stock, there is provided a shearing member fixed to a rotating member and being of a thickness equal to the desired length of insulator to be cut from the tubular stock which is fed through a combined guide and shearing member positioned to cooperate with the other shearing member. The stock is fed against the rotating member and the lengths of tube are gauged by the thickness of the first shearing member.

A better understanding of the invention may be had by reference to the following detailed description considered in conjunction with the accompanying drawing, wherein Fig. 1 is a plan view of an insulator forming apparatus;

Fig. 2 is a front elevational view of the structure shown in Fig. 1, and

Fig. 3 is a fragmentary sectional view, taken on the line 3—3 of Fig. 2, in the direction of the arrows.

Referring now to the drawing, wherein like reference numbers designate the same parts throughout the several views, the reference numeral 1 indicates a base having a bearing block 2 mounted thereon for rotatably supporting a shaft 3. Keyed to the shaft at 4 for rotation therewith is a cutter supporting disc 5 having a cutter 6 fixed thereto by means of screws 7. The cutter 6 is mounted upon the disc at a slight angle to the radii of the disc and is provided with a cutting notch 8 having a shearing edge at 9. As will be noted by referring to Fig. 3, the notch 8 is cut in the cutter 6 at a slight angle to the face of the cutter, thereby to make the cutting edge 9 slightly less than a right angle.

Also mounted upon the base 1 is a tool support 11, having an upwardly extending portion 12, in which there is formed a slot 13 for receiving a tool 14 which may be clamped in place within the aperture 13 by means of set screws 15. The tool 14 has an aperture 16 formed therein for receiving and guiding a rod or tube 17 to be cut into predetermined lengths. The aperture 16 in the tool 14 and the notch 8 in the cutter 6 are of a size slightly larger than the size of the rod or tube to be cut off, and the thickness of the cutter 6, as measured from the right hand side of the cutter supporting disc 5 to the right hand side of the cutter 6, Fig. 3, is equal to the length of section of tube which it is desired to sever from the stock.

In the operation of the device for cutting off predetermined lengths of tubular or rod stock, the shaft 3 is rotated in a suitable manner by a motor, not shown, to drive the cutter supporting disc at a high rate of speed, and rod or tubular stock which it is desired to cut to predetermined short lengths may be fed by hand through the aperture 16 and against the face of the disc 5, whereupon the rapidly rotating cutter 6, carried by the cutter supporting disc, will shear the desired length of stock from the supply thereof and the operator need only continue to press the rod or tube 17 to the left, Fig. 3, thereby rapidly forming a large number of small sections of the stock being cut.

Although the invention has been illustrated by an embodiment comprising a somewhat complete machine, it will be understood that the cutter supporting disc 5 could be mounted in the jaws of a chuck lathe and the tool 14 could be mounted in the tool rest of the lathe. This and other modifications of the invention might be made, however, without departing from the scope of the appended claims.

What is claimed is:

1. In an apparatus for cutting tubular stock into predetermined lengths, a rotatable disc, a cutter mounted eccentrically on said disc for movement in a circular path during the rotation of the disc and having a semicircular notch cut therein which terminates in a shearing edge, and a guide positioned adjacent said disc for directing stock against the face of said disc in the path of the cutter, said guide and cutter having cooperating shearing edges for shearing from the body of the stock lengths of stock equal in length to the thickness of the cutter.

2. In an apparatus for cutting tubular stock into predetermined lengths, a rotatable cutter supporting disc, a guide for directing stock against the face of said disc, and a cutter having a semi-circular notch cut therein which terminates in a shearing edge, said guide being positioned to cooperate with the cutter to effect a shearing of the stock.

3. In an apparatus for cutting tubular stock into predetermined lengths, a rotatable cutter supporting disc, a cutter mounted on said disc and having a semicircular notch cut therein, which notch gradually decreases in radius away from the cutter supporting disc to provide a shearing edge, and a guide for directing stock against the face of said disc and positioned to cooperate with the cutter to effect a shearing of said stock.

FRANCIS P. TIKALSKY.